March 19, 1957   B. BARÉNYI   2,785,921
MOTOR VEHICLE WITH A LATERALLY HINGED HOOD-LIKE UPPER PART
Filed May 10, 1952
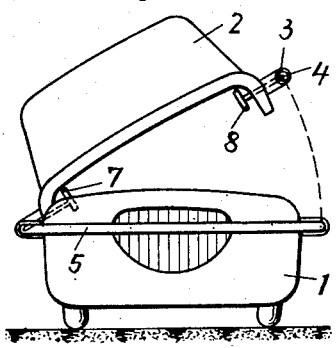
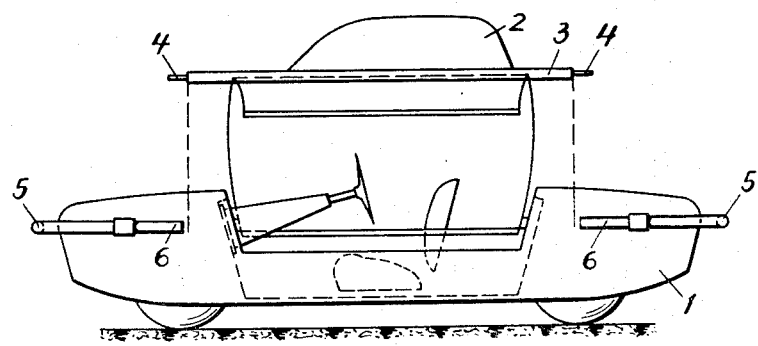
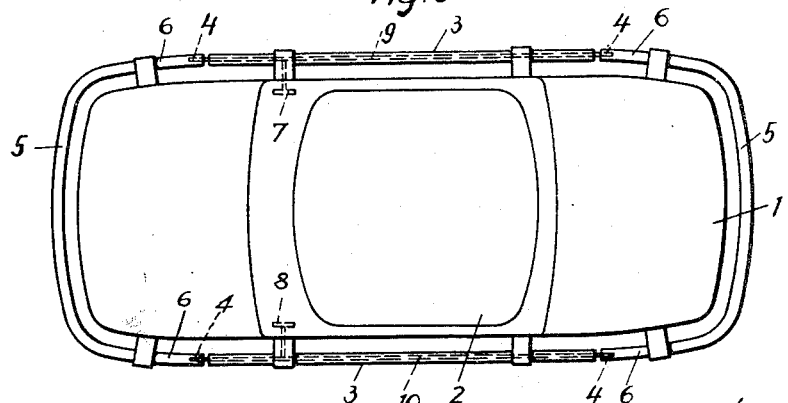
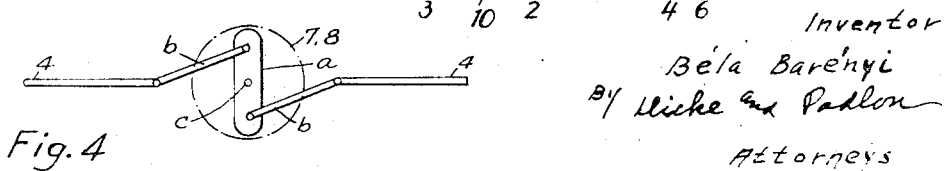
Inventor
Béla Barényi
By Michel and Parton
Attorneys

United States Patent Office 2,785,921
Patented Mar. 19, 1957

2,785,921

MOTOR VEHICLE WITH A LATERALLY HINGED HOOD-LIKE UPPER PART

Béla Barényi, Stuttgart-Rohr, Germany, assignor to Daimler-Benz Aktiengesellschaft, Stuttgart-Unterturkheim, Germany Application May 10, 1952, Serial No. 287,183

Claims priority, application Germany May 12, 1951

4 Claims. (Cl. 296—28)

The present invention relates to a motor vehicle which is provided with a laterally hinged hood-like upper part forming the roof thereof. More particularly, the present invention relates to a motor vehicle which comprises a hood-like upper part which covers the central portion of the vehicle and which is hinged on both sides of the vehicle and wherein the hinges are provided with releasable locking devices so that the hood may be opened to either side.

In a well-known motor vehicle of this type, the hinges of the hinged upper part are located in the covering of the frame or chassis or the body itself, whereas the present invention proposes the hinge axis of the hood to be arranged at a distance from the body or covering of the frame.

An advantage of the present invention resides in that the hinges of the hood are disposed outside the body or chassis covering whereby the seam between the hood and this covering will be releasably sealed.

Moreover, the upper part in accordance with the present invention may be hinged advantageously on either side even with a body contour which is repeatedly curved, by hinges which are arranged on either side of the body and which are designed so that the hinged part may simultaneously be separated on one side of the body and locked on the other side. In that case, the controlling device, as, for example, a control lever, may appropriately be provided for within reach of the driver, for example, at the instrument panel in order to lock the hinged parts.

It is accordingly an object of the present invention to provide a hood-like upper part for a motor vehicle which covers the center part thereof and thereby forms the roof therefor.

It is a further object of the present invention to provide such a hood-like part which is hinged on either side of the vehicle.

It is a still further object of the present invention to provide a hinged hood-like upper part for the central portion of a motor vehicle which is provided with hinges on both sides thereof and which comprises selective locking and releasing means from within the vehicle within easy reach of the driver so that one hinge may be locked while the other may be released.

A still further object of the present invention resides in the location of the hinges at a distance from the body of the vehicle wherein the hinged part forms a continuous skirting or bar which surrounds the vehicle body and which serves to prevent damage to the body in case of collision or rubbing with another object or vehicle.

In order to open and close the upper part from the driver's seat by hand or by means of a suitable driving gear arrangement, the hood, according to the present invention, may be connected with a rod control or a driving gear for effecting hinging thereof. In the latter case, the control device for the driving gear, which operates the hood, may be connected advantageously with the control device for locking the hinged parts so that the driving device for opening the hood may be engaged simultaneously when locking the hinged parts on the one side of the body and disengaging the hinged parts on the other side thereof.

In order to avoid the lateral projection of the hinges of the hood which might cause troubles and inconveniences, they may, according to the present invention, be incorporated advantageously in a bar forming a rubbing strake which encircles the covering of the chassis or the body in a ring-shaped manner at a certain distance whereby the bar or rubbing strake effectively forms a skirting which protects the body against damages in case of collision and the like. The largest extent of the dimension of the body in length and/or in width may preferably lie above the wheel axes, and the rubbing strake may be disposed on a level with this largest extent. The arrangement of the bar or rubbing strake in accordance with the present invention at a distance from the body or frame covering is also novel and ingenious in itself and in contrast with the well-known arrangement where such bars or rubbing strakes are fastened directly to the frame covering or body in the form of bars, strips, and the like.

Further objects and advantages of the present invention will become more obvious from the following description when taken in connection with the accompanying drawing which shows for purposes of illustration only one preferred embodiment in accordance with the present invention, and wherein:

Figure 1 is a front view of a motor vehicle with the opened upper hood-like part constructed in accordance with the present invention;

Figure 2 is a side view of the motor vehicle shown in Figure 1;

Figure 3 is a plan view of the motor vehicle in accordance with the present invention with the upper part in closed position; and Figure 4 is a schematic view indicating a means for opening the pivots 4 from within the vehicle.

Referring now more particularly to the drawing wherein like reference numerals designate like parts in the various views thereof, reference numeral 1 designates the body of any motor vehicle designed in any way and of any type, as, for example, of the pontoon type.

In an opening in the center of body 1 there is provided a hood-like part 2 for purposes of covering the center portion of the motor vehicle which may be hinged on either side of the vehicle. For that purpose, a protecting bar 3 is provided on either side of the hood 2 at a distance therefrom which serves simultaneously as a rubbing strake or anti-collision guard. The ends of bar 3 may project beyond the hood 2; each bar 3 is provided with a pivot 4 at each end thereof. At either end of the motor vehicle, a stirrup-like bar or rubbing strake 5 is provided suitably so that it encircles the chassis covering or body 1 preferably at the same distance as that between bars 3 and hood 2. At their respective ends, the stirrup-like rubbing strakes 5 are each provided with a bearing 6 in which pivots 4 engage. These bearings 6 are appropriately provided with locking devices which are so formed that pivots 4 may be locked at will on one side of body 1 and may be released on the other side thereof, so that the hood 2 may be opened toward the side of the locked pivots 4. This locking device may be so designed that it may be operated from the driver's seat.

For purposes of opening and closing the hood 2, an appropriate mechanical, pneumatic, electrical, or hydraulic gearing arrangement may be provided for which may be operated by hand or by means of an appropriate driving device.

The locking device of pivots 4 is preferably designed in such a way that pivots 4 may be locked on either side of the hood 2 during driving of the vehicle, and may be released on one side when opening the hood.

In the illustrated example of design, a handle 7 or 8 serves to operate a pulling member 9 or 10, respectively, which, for example, may be a Bowden cable in order to pull the pivots 4 into the bar for opening the lock.

Figure 4 illustrates one arrangement for withdrawing the pivots 4 into the bar to open the lock. The handle 7 or 8 which is shown in Figure 4 in phantom lines is connected with a lever arm $a$ for common rotation therewith. The lever arm $a$ is connected with the extensions of the pivots 4 by means of connecting rods $b$ of any suitable nature which are pivotally connected at both ends thereof to the lever $a$ and the extensions of the pivots 4. The handle 7 or 8 is rotatably supported about the axis $c$ so that upon rotation of the handle 7 or 8 in the clockwise direction the pivot extensions are moved in the direction toward the axis $c$ whereby the pivots 4 are withdrawn within the bars 3 so that the hood 2 may be opened. For purposes of closing, it is only necessary to rotate the handles 7 or 8 in the counter-clockwise direction after the hood 2 is again closed. The arrangement in Figure 4 is of well known construction.

What I claim is:

1. In a passenger motor vehicle with a body which may be boarded by the passengers directly from the road, a protecting bar surrounding said body, means for securing said protecting bar to said body at such a distance therefrom as to lie outside the tread of the vehicle wheels, a hinged hood-like upper part covering the center portion of said vehicle, and means for hingedly fastening said upper part along both sides of said body, said means having hinge pin means located along the side of the body at such a distance therefrom as to lie outside the tread of the vehicle wheels, said hinge pin means forming a portion of said protecting bar surrounding the covering of the vehicle frame.

2. In a passenger motor vehicle according to claim 1, wherein said hinge pin means includes pivots extending therefrom into the portions of said protecting bars adjacent to said hinge pin means, said pivots being movable axially out of said adjacent portions of said protecting bars in the direction of respective hinge pin means.

3. In a passenger motor vehicle according to claim 2, further including controllable locking means on the inner left and right sides of said hood for locking said pivots against axial movement thereof, said locking means being within reach of the driver of the vehicle.

4. In a passenger motor vehicle according to claim 2, wherein the greatest horizontal extent of the vehicle structure lies above the wheel axes, and wherein said protecting bar formed in part by said hinge pin means is located at approximately the same height as said greatest extent.

References Cited in the file of this patent

UNITED STATES PATENTS

| | | |
|---|---|---|
| D. 149,539 | Brown | May 11, 1948 |
| 976,572 | Jeffery | Nov. 22, 1910 |
| 1,783,934 | Banschbach | Dec. 2, 1930 |
| 1,934,074 | Kubler | Nov. 7, 1933 |
| 1,935,993 | Reutter | Nov. 21, 1933 |
| 2,177,793 | Taylor | Oct. 31, 1939 |
| 2,311,965 | Reynolds | Feb. 23, 1943 |
| 2,362,453 | Cosper | Nov. 14, 1944 |
| 2,532,948 | Sanden | Dec. 5, 1950 |
| 2,551,054 | Sanmori | May 1, 1951 |
| 2,557,339 | Campbell | June 19, 1951 |
| 2,612,964 | Hobbs | Oct. 7, 1952 |

FOREIGN PATENTS

| | | |
|---|---|---|
| 677,690 | France | June 11, 1924 |